Nov. 29, 1932.  G. S. ANKARLO  1,889,621
GAS MAIN STOPPER
Filed Nov. 13, 1930
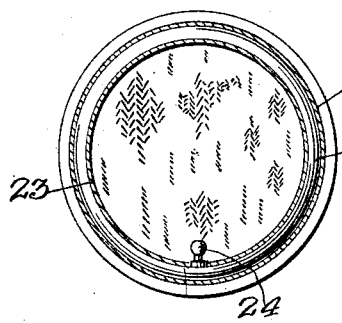
Fig. 2.
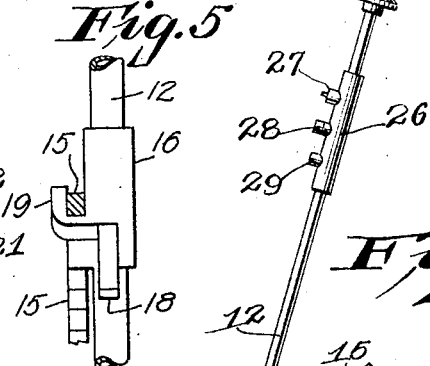
Fig. 5.
Fig. 1.
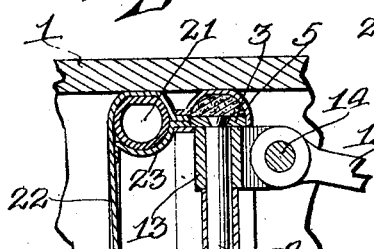
Fig. 3.
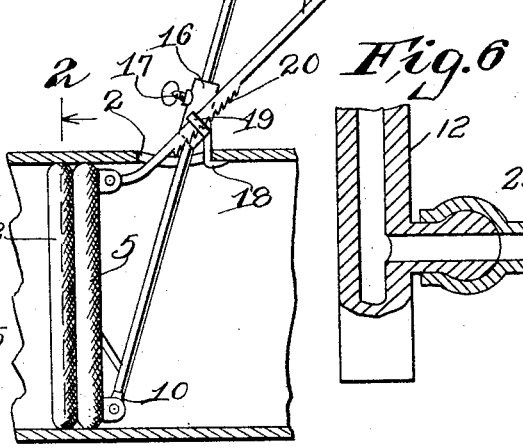
Fig. 6.
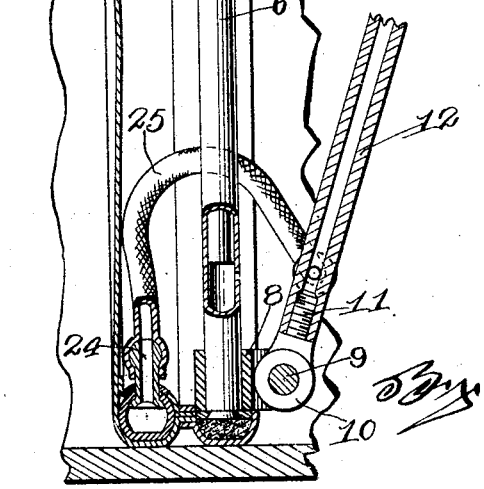
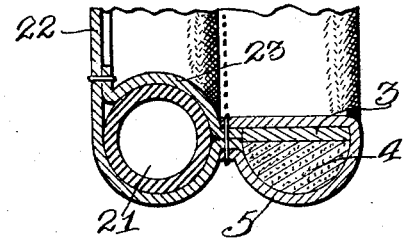
Fig. 4.
Inventor
G. S. Ankarlo
Attorneys Patented Nov. 29, 1932

1,889,621

UNITED STATES PATENT OFFICE

GEORGE S. ANKARLO, OF MILWAUKEE, WISCONSIN

GAS MAIN STOPPER

Application filed November 13, 1930. Serial No. 495,459.

This invention relates to improvements in gas main stoppers.

One of the objects of the present invention is to provide an improved gas main stopper which can be readily inserted into a gas main through a suitable opening and yieldably retained in position within the pipe for sealing the same to prevent the flow of fluid therethrough while repairing a break in the line.

Another object of the present invention is the provision of a gas main stopper which includes a yieldable retaining member adapted to be expanded upon the interior of the gas main to grip the walls thereof, and is further provided with a pneumatic sealing member adapted to be inflated to bring the walls thereof into intimate contact with the inner walls of the gas main, the outer surface of the tube adapting itself to the contour of the interior of the gas main so as to provide a positive seal for the same, the tube carrying a fluid proof diaphragm which is stretched across the diameter of the pipe for retaining the flow of fluid during the repairing of a break in the line.

Another object of the present invention is the provision of a gas main stopper provided with improved means for maintaining the same in operative position transversely of the pipe, and wherein the retaining means can be quickly and easily released when desired, and the stopper so constructed as to permit the same to be readily inserted through a small opening in the gas main, or withdrawn therethrough, and the device also includes a pneumatic sealing member with improved means for inflating the same after being inserted in the gas main.

With the above and other objects in view, the invention consists in the novel features of construction, the combination and arrangement of parts hereinafter more fully set forth, pointed out in the claims and shown in the accompanying drawing wherein:

Figure 1 is a longitudinal sectional view of a gas main, illustrating my device in operative position;

Figure 2 is a transverse sectional view on the line 2—2 of Figure 1;

Figure 3 is an enlarged vertical sectional view with the device in operative position and showing parts thereof in elevation;

Figure 4 is an enlarged transverse section taken through the clamping member and the pneumatic sealing member;

Figure 5 is a fragmentary detail of the adjustable lever lock; and

Figure 6 is a fragmentary detail of the inflating hose connection.

The usual method for sealing gas mains during the repairing of a break therein or for various other purposes, is to provide the main 1 with an opening 2 adjacent the break, and between the break and the source of supply, so that a stopper can be inserted into the main through the opening 2 and fixed in position so as to retain the flow of the fluid within the main and prevent the escape of the fluid around the break. It is rather difficult to obtain a device which can be quickly placed in position and which at the same time will conform to the contour of the interior of the gas main and provide a positive seal.

It is, therefore, one of the principal objects of this invention to provide a device wherein a positive seal will be assured. The invention consists of a yieldable supporting element in the shape of a spring member 3, normally disposed in a substantially circular position as shown in Figure 2. This spring has arranged upon the exterior thereof, a felt or yieldable fabric pad 4 which is retained in engagement with the spring 3 by means of the covering 5.

The spring is connected at diametric points by means of a telescopic connection which includes the tubular member 6 and the rod 7. Mounted upon the tube 6 adjacent one side of the spring 3 is a sleeve 8 carrying a hinge pin 9 upon which is rotatably mounted the head 10 of a screw 11. The screw member 11 engages upon the interior of a tubular arm 12.

Attached to the rod 7 adjacent the spring member 3 is a sleeve 13 carrying a hinge pin 14 upon which is mounted the inner end of lever 15. Adjustably mounted upon the tubular arm 12 is a sleeve 16 carrying a set screw 17 whereby this sleeve may be adjusted to various points along the arm 12 and retained in operative position. The sleeve 16 carries a hook 18 which is adapted to be engaged beneath the edge of opening 2, as shown in Figure 1 and extending laterally from the sleeve 16 is a guide member 19 through which lever 15 slides. This guide member is provided with a tooth adapted to be engaged by the teeth of the rack portion 20 on lever 15 for retaining the lever in various adjusted positions relative to arm 12 and sleeve 16.

Ordinarily, a diaphragm or stopper is carried by the spring member 3 so that when this member is expanded in the gas main to engage the covering 5 with the interior thereof, the diaphragm will be expanded to stop the flow of fluid through the pipe. It has been found, however, that where a cast metal pipe is used for gas mains, there is considerable roughness to the interior of the surface and thus there will be a certain amount of leakage around the contacting portions of pad 4 and cover 5.

To do away with the above objections, I provide a pneumatic tube 21 which is arranged within the diaphragm covering 22. The outer edges of this diaphragm 22 extend around the tube 21 and are connected to the cover member 5, and an additional strip 23 is used for properly retaining the tube 21 in position and assists in connecting the same to the cover 5 as clearly illustrated in Figure 4. The tube 21 is provided with a filling nipple 24 to which is attached a flexible tube 25. The tube 25 is connected to the tubular arm 12, as shown in Figure 3, and the tubular arm 12 is provided adjacent its outer end with an enlarged chamber 26 which carries a release valve 27 of the ordinary type for releasing the fluid within the tube 21 when so desired. The chamber 26 also carries an inlet valve 28, whereby any suitable source of pressure can be used for inflating the tube 21. Connected with the chamber 26 is a safety valve 29 which can be set in accordance with the amount of pressure desired within tube 21, so that when this pressure is exerted, the safety valve 29 will permit escape of the fluid pressure to prevent injury to tube 21.

In the operation of my improved gas main stopper, the tube 21 is normally in a deflated position and spring member 3 can be compressed so as to be inserted through the opening 2. After this spring member is inserted through the opening 2, the lever 15 and arm 12 can be readily manipulated to position the spring member within the pipe so as to be in a substantially horizontal position relative to the pipe, as shown in Figure 1, the rack 20 of lever 15 being engaged with the guide 19 for retaining the same in this position. Immediately upon positioning the spring member 3, the tube 21 can be quickly inflated, and as the tube 21 is inflated, the diaphragm 22 will be stretched out tight across the pipe as shown in Figure 3, the tube forcing the edges of the diaphragm into intimate contact with the inner surfaces of the pipe and due to the flexibility of the tube, it will assume the contour of the interior of the pipe and provide a positive seal, while the engagement of cover 5 with the interior of the pipe will assist in holding the device in place.

It will be noted that sleeve 16 can be readily adjusted along arm 12 so that the device can be quickly positioned in gas mains of various diameters, and while I have shown and described one specific form for connecting up the tubular arm with a source of pressure, it will be apparent that a plunger could be mounted in arm 12 and the device used as a pressure pump for filling a pneumatic tube.

It is believed from the foregoing that I have provided a comparatively simple and inexpensive device adapted for use as gas main stoppers, wherein the pneumatic tube 21 will provide a positive seal for the interior for the gas main and will be retained in position by means of the spring member 3, the arm 12 and the lever 15, and due to the flexibility of tube 21, the entire contour of the interior of the pipe will be engaged so as to provide a positive seal in connection with the diaphragm 22.

While I have shown and described the preferred embodiment of my invention, it will be apparent from the foregoing that slight changes may be made in the construction when putting the invention into practice without departing from the spirit of the same or the scope of the appended claims.

I claim:

1. A device of the class described including a flexible supporting member, retaining members having pivotal connection with said supporting member, a pneumatic tube supported at one side of the supporting member, a diaphragm arranged over the tube, and means whereby to inflate said tube for urging the diaphragm into intimate contact with the interior of a gas main.

2. A stopper for gas mains including a yieldable supporting member, a tubular arm pivotally connected to one side thereof, a lever pivotally connected to the opposite side thereof, a sleeve slidably mounted on the tubular arm, means for providing adjustable connection between the lever and the sleeve, a pneumatic sealing member carried by the supporting member, and a foldable diaphragm arranged over the exterior of the pneumatic sealing member.

3. A gas main stopper including a yieldable supporting member adapted to be positioned upon the interior of the gas main for yieldably engaging the inner wall thereof, means for retaining said member in operative position, a pneumatic sealing member carried by the yieldable supporting member, a foldable diaphragm carried by said pneumatic sealing member, a tubular arm, means forming communication between the pneumatic sealing member and the tubular arm, means carried by said arm whereby to introduce a pressure in said sealing member, additional means carried by the arm for releasing pressure within said sealing member.

In testimony that I claim the foregoing I have hereunto set my hand at Milwaukee, in the county of Milwaukee and State of Wisconsin.

GEORGE S. ANKARLO.